United States Patent [19]
Johnson

[11] Patent Number: 5,571,596
[45] Date of Patent: Nov. 5, 1996

[54] ADVANCED COMPOSITE ROOFING SHINGLE

[76] Inventor: Matthew E. Johnson, 4054 Glen Avon Ct., Fort Worth, Tex. 76109

[21] Appl. No.: 172,324

[22] Filed: Dec. 23, 1993

[51] Int. Cl.$^6$ .............................. E04D 1/22; B32B 5/28
[52] U.S. Cl. .................... 428/143; 428/149; 428/150; 428/252; 428/246; 428/251; 428/338; 428/913; 428/489; 428/474.4; 428/255; 428/247; 52/518; 52/555; 52/557
[58] Field of Search .................... 428/143, 149, 428/150, 252, 246, 251, 338, 913, 489, 474.4, 255, 247; 52/518, 555, 557

[56] References Cited

U.S. PATENT DOCUMENTS

| | | | |
|---|---|---|---|
| 1,873,886 | 8/1932 | Heppes | 428/143 |
| 2,044,788 | 6/1936 | Harshberger | 108/3 |
| 2,490,430 | 12/1949 | Grieder et al. | 428/149 |
| 3,180,783 | 4/1965 | Walker | 161/93 |
| 3,663,350 | 5/1972 | Stokes | 161/151 |
| 4,186,236 | 1/1980 | Heitmann | 428/291 |
| 4,219,603 | 8/1980 | Thun | 428/246 |
| 4,233,353 | 11/1980 | Bondoc et al. | 428/141 |
| 4,244,353 | 1/1981 | Straza | 126/432 |
| 4,288,959 | 9/1981 | Murdock | 52/518 |
| 4,468,422 | 8/1984 | Siener, Jr. et al. | 428/57 |
| 4,491,617 | 1/1985 | O'Conner et al. | 428/236 |
| 4,539,254 | 9/1985 | O'Conner et al. | 428/236 |
| 4,610,902 | 9/1986 | Eastman et al. | 428/57 |
| 4,749,609 | 6/1988 | Lempereur | 428/255 |
| 4,780,350 | 10/1988 | O'Conner et al. | 428/109 |
| 4,788,088 | 11/1988 | Kohl | 428/34.5 |
| 4,817,358 | 4/1989 | Lincoln et al. | 52/557 |
| 4,848,057 | 7/1989 | MacDonald et al. | 52/518 |
| 4,869,942 | 9/1989 | Jennus et al. | 428/77 |
| 4,875,321 | 10/1989 | Rohner | 52/553 |
| 4,920,721 | 5/1990 | Pressutti | 52/518 |
| 4,965,977 | 10/1990 | White | 52/410 |
| 5,037,685 | 8/1991 | Richards et al. | 428/40 |
| 5,052,162 | 10/1991 | Bush et al. | 52/518 |
| 5,060,444 | 10/1991 | Paquette | 52/535 |
| 5,108,831 | 4/1992 | Green | 428/291 |
| 5,195,290 | 3/1993 | Hulett | 52/518 |
| 5,347,785 | 9/1994 | Terrenzio et al. | 52/555 |
| 5,439,726 | 8/1995 | Woiceshyn | 428/109 |

OTHER PUBLICATIONS

Air Frames Structural Design, pp. 499, 500, 502, 514.
"What's Up, Why Aren't Roofs Lasting Longer?" *Building Systems*, May 1991.
Advertisement, 2 pages from Alexander Aeroplane Company, Inc., undated.
"Nature's Building Blocks", *Popular Science* 1993 month unknown. pp. 74–75.
"Hail Resistance of Roofing Products", Sidney H. Greenfeld, 1969 month unknown, p. 1 and Appendix A.
"A Simulated Hail Test Facility", Appendix A, undated.
"The Behavior of Structures Composed of Composite Materials" by J. R. Vinson and R. L. Sierakowski, 1987, month unknown 1 page.
"Fundamentals of Composites Manufacturing: Materials, Methods, Applications" Dr. A. Brent Strong, Society of Manufacturing Engineers, pp. 61, 62, 66,67, 68, 69, 89, undated.

(List continued on next page.)

*Primary Examiner*—William Watkins
*Attorney, Agent, or Firm*—Richards, Medlock & Andrews

[57] ABSTRACT

An advanced, lightweight composite roofing shingle specifically designed to prevent hail damage and high wind uplift. The inventive laminate includes a conventional random fiberglass mat (20) used for shingle stability, sandwiched by an upper ply of Kevlar fabric (28) selected for high impact resistance, and a bottom ply of E-glass fabric (24) or similar type oriented for exceptional bending resistance. The fibrous materials are saturated or coated, and bonded with a suitable matrix such as roofing asphalt. Design flexibility, inherent in the novel roofing shingle concept, allows the material properties to be optimized for cost and performance based on weather requirements in various geographical regions of the country.

24 Claims, 6 Drawing Sheets

FIG. 6B SCHEMATIC
WINDFORCE REACTIONS—
INVENTIVE SHINGLE

OTHER PUBLICATIONS

Joseph Truini & Judith Trotsky, 'Top Secrets (A Buyers Guide)', Home Mechanix, Apr. 1992, pp. 55–61, 87, 95.

Jeff Wallach, 'True Colors', Popular Science, May 1992, p. 50.

Mariette DiChristina, 'Radiant–Barrier Paint', Popular Science, Jun. 1992, p. 48.

John Andrews, 'Roofing Technology Shines', Custom Builder, Jul./Aug. 1992, pp. 66–69.

Marcelle Soviero, 'Roofs Redux: Now Plastic', Popular Science, Jan. 1993, p. 37.

Mark Wrolstad, 'Raising the Roof', Dallas Morning News, May 4, 1993, pp. 1D, 15D.

Jerry Shine, 'Modular Roofs', Popular Science, Sep. 1993, p. 50.

Dobson Contractors, Inc. advertisement for Gerard Roofing, 1993.

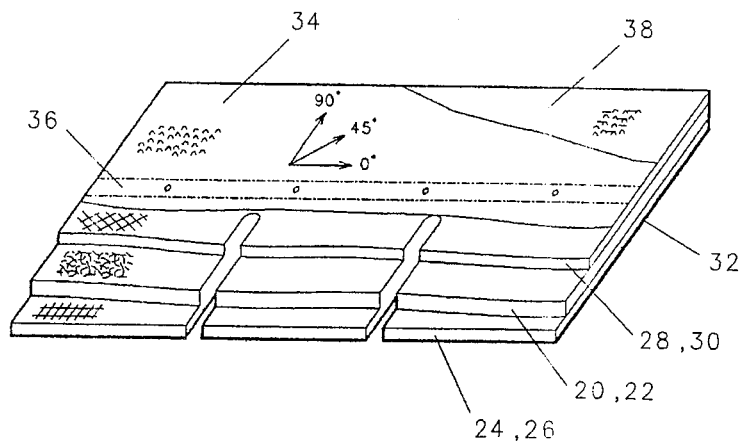
FIG. 1
SINGLE-LEVEL DESIGN CUTAWAY
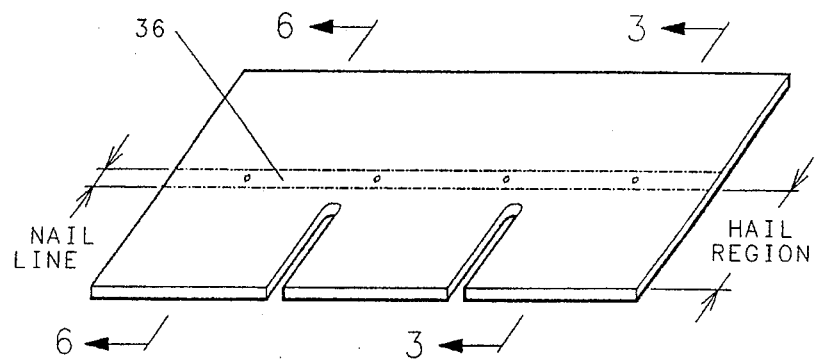
FIG. 2
SINGLE-LEVEL SHINGLE DESIGN
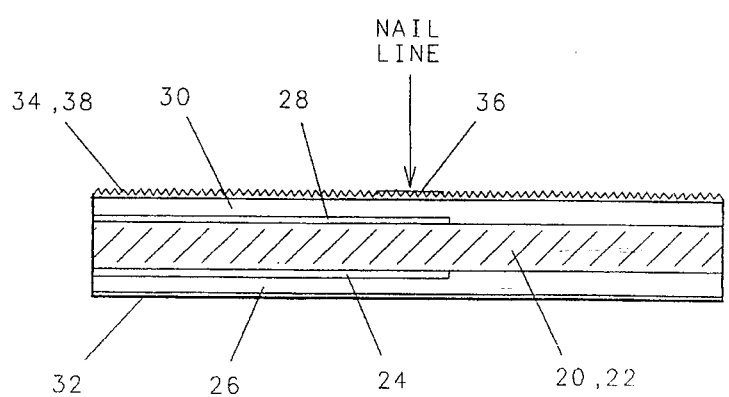
FIG. 3 SCHEMATIC
SINGLE-LEVEL CROSS-SECTION

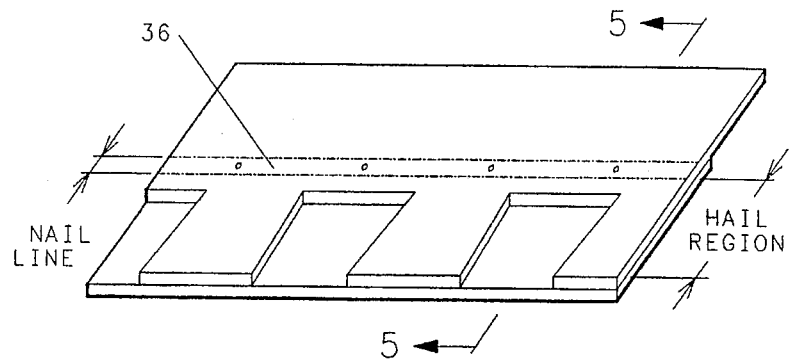
FIG. 4
TWO-LEVEL ARCHITECTURAL SHINGLE DESIGN
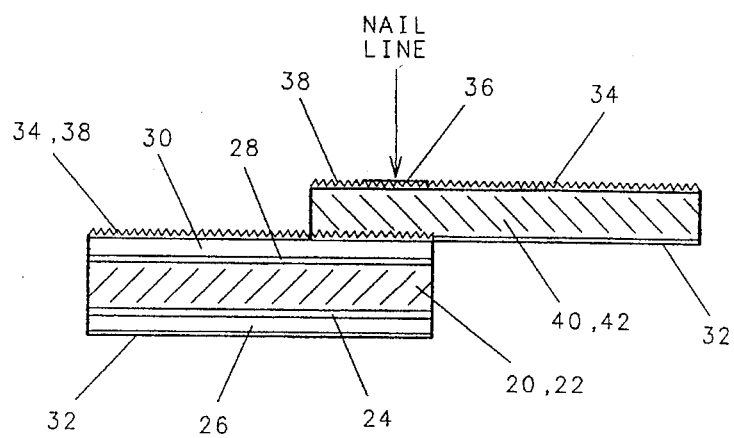
FIG. 5A SCHEMATIC
TWO-LEVEL CROSS-SECTION
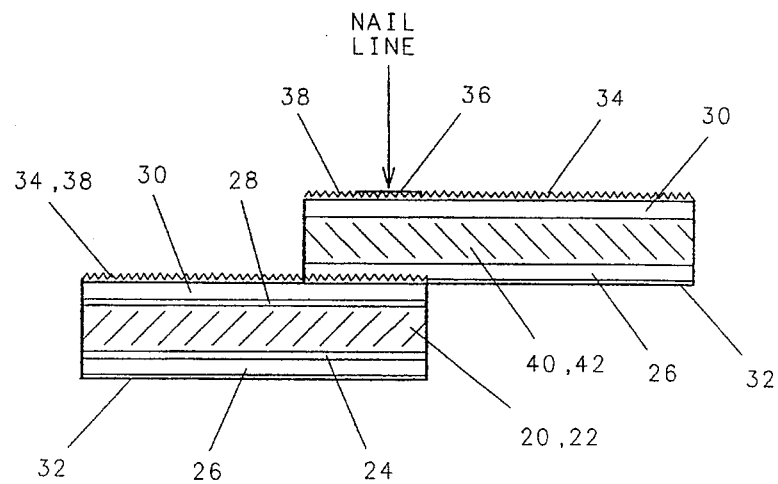
FIG. 5B SCHEMATIC
TWO-LEVEL CROSS-SECTION

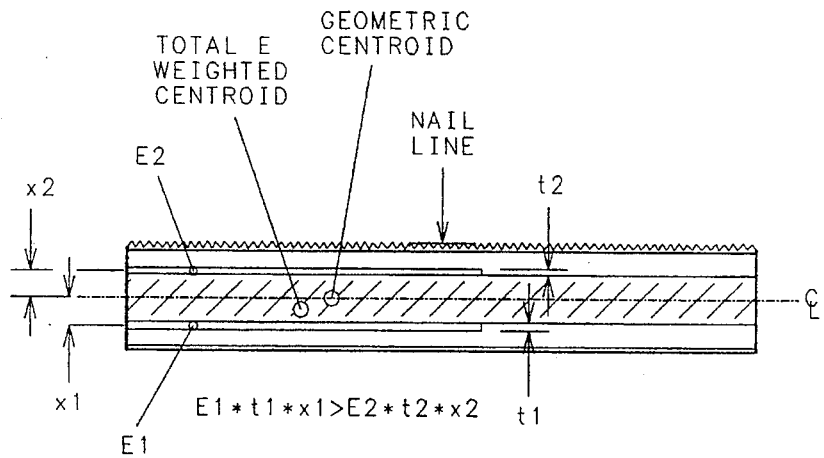
FIG. 6A SCHEMATIC
AEROELASTIC TAILORING CONCEPT
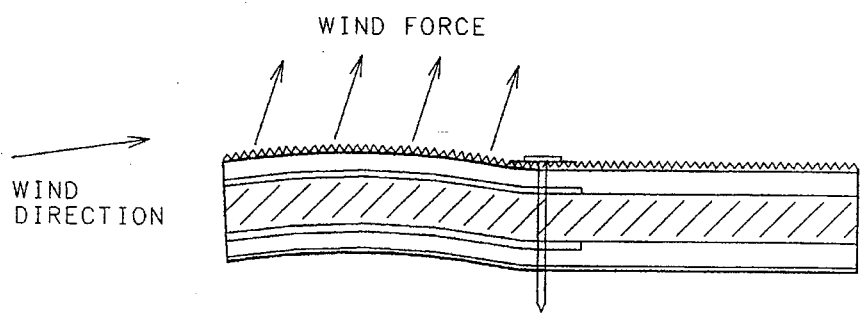
FIG. 6B SCHEMATIC
WINDFORCE REACTIONS—
INVENTIVE SHINGLE
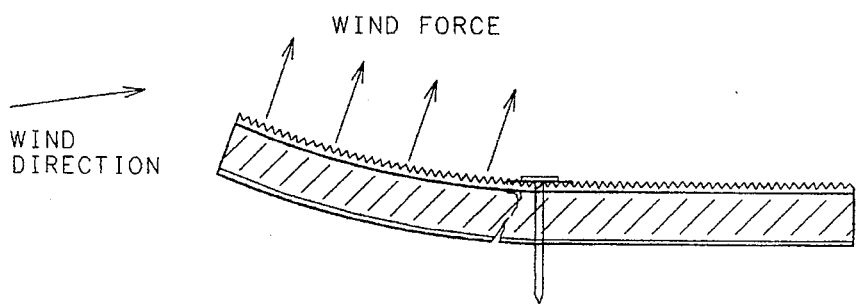
FIG. 7 SCHEMATIC
WINDFORCE REACTIONS—
PRIOR ART

TWO-LEVEL PLY STACK SEQUENCE

SINGLE-LEVEL PLY STACK SEQUENCE

SINGLE PLY CONSTRUCTION

TWO LEVEL CONSTRUCTION

CONSTRUCTION PROCESS FLOWCHART

| CLASS | d | D | DESCRIPTION | MATERIAL SEL | | | HYBRID |
|---|---|---|---|---|---|---|---|
| | | | | A | B | C | A |
| 1 | <1 | <.3 | PEBBLE | — | MAT | — | — |
| 2 | 1–2 | .3–.6 | GRAPE | — | MAT | — | — |
| 3 | 2–4 | .6–1.2 | CHERRY TOMATO | E | MAT | E | K/E=0 |
| 4 | 4–6 | 1.2–1.8 | GOLF BALL | S | MAT | E | K/E=1 |
| 5 | 6–8 | 1.8–2.4 | RACQUETBALL | K | MAT | E | K/E=2 |
| 6 | >8 | >2.4 | BASEBALL | K | MAT | E | K/E=4 |

HAIL SIZE CLASS AND MATERIAL SELECTION

ADVANCED COMPOSITE ROOFING SHINGLE

BACKGROUND—FIELD OF INVENTION

This invention relates to the roofing field, in particular to an innovative composite shingle which uses advanced aerospace materials to provide increased resistance to hail and wind storm damage.

BACKGROUND—PRIOR ART

Roofing shingles are commonly used to cover and protect housing structure from the effects of weather. Various types of shingle materials available include asphalt composition, wood, tile, rock, and metal roofing systems. Most of these have a moderate resistance to impact damage and wind uplift. Nevertheless, destruction caused by large hail and high winds has been well documented and has cost consumers billions of dollars in needless roofing repairs and replacement over the years. Once removed, damaged shingles must be properly disposed of and this has contributed to environmental waste problems.

Roofing systems must also achieve a balance of durability, cost, weight, appearance, manufacturability and ease of installation when being considered for use. Regrettably, previous products have not made use of maturing technologies and advanced material applications now available from the Aerospace field. For instance, the 'concrete bunker' approach has been used. Concrete shingles, including modified types using fillers, can easily withstand hail and wind damage if made thick and heavy enough. However, the installed roofing would require additional underlying structural support and be very costly. Tile roofs also fall within this category and are prone to cracking. Both types retain excess heat in the summer. Aluminum and steel shingles are strong, but can easily dent when thin, lighter weight material gages are used. Noise from rain and hail storm impact is also a nuisance. As an expense, some metal roofing systems can cost several times more than asphalt shingles. In general, the above mentioned shingles become cost and weight prohibitive as the level of protection increases.

Wood shingles, including shakes, provide a natural look but are susceptible to hail damage, which can cause wood cracking and splintering. They also create a potential fire hazard, and in other weather extremes the wood may rot and mildew. Pressed wood shingles overcome some of those disadvantages, but have low wind resistance.

Asphalt composition shingles have gained in popularity because of their low cost and weight while having an attractive appearance. When inorganic fiberglass mat is used, the shingles exhibit reasonable non-directional strength properties, yet remain flexible enough for easy installation. However, due to their inherent construction, these shingles are not resistant to puncturing when nailing to underlayment during installation. Hail storms can cause shingle tearing or worse yet, imperceptible laminate damage, while shingle up-lift can occur as low as fifty-five miles per hour. As a result, shingles warranted to last twenty or more years must be replaced prematurely when a destructive storm arises.

Several prior patents have attempted to solve some of the aforementioned technical obstacles with limited success. U.S. Pat. No. 5,060,444 by Paquette describes a cumbersome ventilated shingle system which has insulative properties. U.S. Pat. Nos. 4,848,057 and 3,180,783 attempt to solve wind up-lift requirements to prevent shingle loss in storms. U.S. Pat. No. 4,610,902 describes a shingle with superior elongation and flexibility properties while having good wind resistance characteristics. Nevertheless, none of the patents specifically address impact resistance from hail storms in relation to roofing materials or systems.

There is therefore a requirement for a hail and wind resistant roofing system which overcomes the previously mentioned shortcomings. The ideal durable roofing system should have the following qualities: high dimensional stability, high tear strength properties, good tensile strength properties, high impact resistance, good elongation and elastic properties, good traffic and fire resistance, good wind up-lift resistance, and at least some sound and insulating properties.

OBJECTS AND ADVANTAGES

Accordingly, several objects and advantages of this invention are described which will provide a quantum improvement over existing roofing shingle systems. They are:

(a) to provide a superior hail resistant roofing system by employing advanced composite Aerospace materials known for ballistic impact resistance.

(b) to provide a highly wind resistant roofing system which takes advantage of composite material design versatility to control and tailor shingle bending.

(c) to provide a lightweight yet economical roofing shingle in the price range of existing asphalt roofing by using composites to optimize cost/performance.

(d) to provide a roofing system which uses materials with insulating qualities as well as a paint concept for controlling home energy loss.

(e) to provide a durable roofing system which lives up to its warranty, thus reducing landfill waste and improving the environment.

(f) to provide a roofing shingle whose production allows for minimal modification of existing facilities and can quickly adapt to different production formulations.

(g) to provide a class system whereby composite materials in shingle products can be optimized for geographical zones which require greater hail/wind damage protection than others.

(h) to provide an aesthetically pleasing roofing shingle identical in outside appearance to current asphalt shingle products.

Further objects and advantages of this novel invention will become apparent from a consideration of the drawings and ensuing description of it.

DESCRIPTION OF THE DRAWINGS

In the drawings of the present embodiment, closely related figures have the same number but different alphabetic suffixes.

FIG. 1 is a perspective view of a single-level shingle of this invention wherein layers of material are removed in steps to clearly show typical construction.

FIG. 2 is a perspective view of a single-level type shingle of this invention showing the nail region and potential hail impact areas.

FIG. 3 is a sectional view of the shingle in FIG. 2, taken on the line of 3—3. In this schematic, thickness is exaggerated to show detail.

FIG. 4 is a perspective view of a two-level 'architectural' type shingle of this invention showing nail regions and potential hail impact areas.

FIGS. 5A and 5B are sectional views of the shingle in FIG. 4, taken on the line of 5—5. In the schematics, thickness is exaggerated to show detail.

FIGS. 6A and 6B are sectional views of the shingle in FIG. 2, taken on the line of 6—6. The schematic in FIG. 6A, not to scale, explains the unusual advantage of unbalanced and asymmetrical material construction. FIG. 6B shows the resulting shingle material reaction of this invention to high wind up-lift aerodynamic forces.

FIG. 7 shows a corresponding sectional view of a prior art shingle to that of FIG. 6B, reacting to the same aerodynamic up-lift forces.

LIST OF REFERENCE NUMERALS

Figure 9:
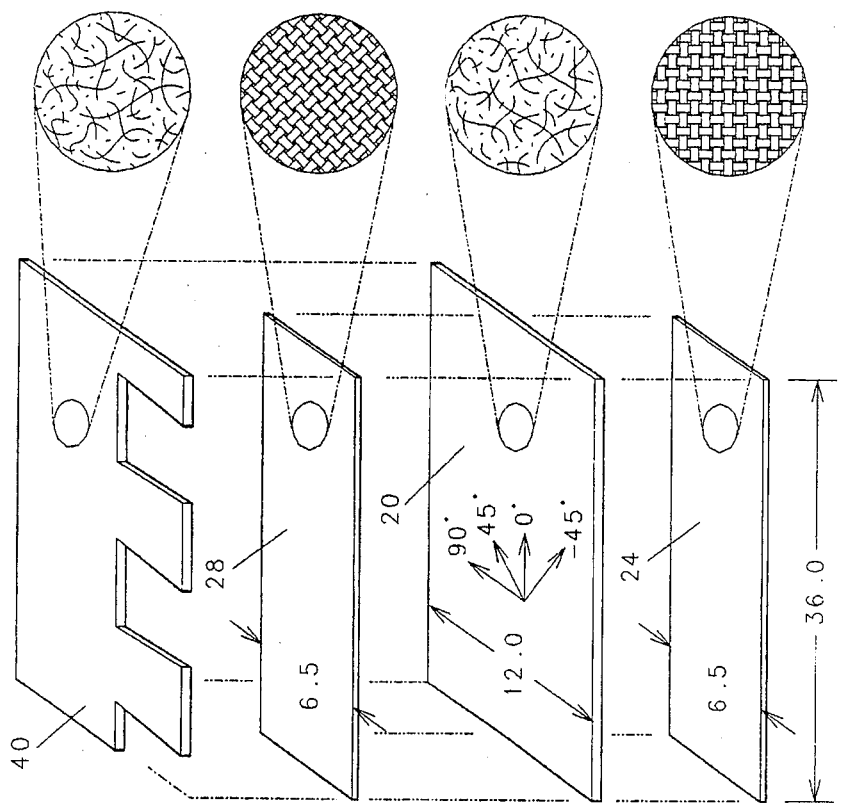
FIG. 9 is an exploded perspective view of a two-level (architectural) shingle of this invention, showing ply stack sequence and close-up details of only the fibrous materials.

| 20 fiberglass mat | 32 non-stick talc |
| 22 asphalt, middle | 34 stone aggregate |
| 24 E-glass fabric | 36 stick strip |
| 26 soft asphalt, lower | 38 thermo-reflective paint |
| 28 Kevlar fabric | 40 fiberglass mat |
| 30 soft asphalt, upper | 42 asphalt, two ply |

DESCRIPTION OF INVENTION—GENERAL

FIG. 1 describes a perspective view of the preferred embodiment in detail. The shingle is comprised of a layer of conventional fiberglass mat 20, saturated with asphalt 22 on both sides. The lower soft asphalt layer 26 contains an embedded sheet of E-glass fabric (24), while the upper soft asphalt layers 30 contains an embedded sheet of Dupont brand Kevlar fabric (28). A thin backing material such as talc 32 provides a non-stick bottom surface, and small stone granules 34 are embedded in the exposed surface of asphalt layer 30. An adhesive asphalt strip 36 on top provides sealing between adjacent shingles upon installation, while an optional thermo-reflective coating 38 is applied over the granule surface.

Generally, the fiberglass mat 20 will be in the range of 0.05 to 0.10 inch in thickness, while the reinforcement materials 24 and 28 may vary from 2 to 10 mils in thickness. The preferred material choices are shown as aramid fibers (Kevlar) and E-glass; however, other material possibilities could include but are not limited to S-glass, Allied Signal brand Spectra, carbon, polyester, nylon fibers and hybrids of the aforementioned hybrid materials can be made by weaving lower cost fibers together with impact resistant fibers of higher cost. Types of fiber weave may include plain, crowfoot, basket, knitted, braided, unidirectional tape, or semi-random mat. Weave patterns may be course or fine. Asphalt coating (matrix) options include common asphalt, and modified asphalt (includes Styrene Butadiene Styrene or SBS), especially for the top coat 30. Other possible material coatings involve but are not limited to Ethylene-propylene-diene-terpolymer (EDPM), polysulfide, toughened epoxy, thermoplastics with plasticizer, and polyester resins.

FIG. 1 also shows the preferred fiber orientation of the woven cloth materials. Orientation is completely random in fiberglass mat 20. However, high strength and performance is achieved by specifically aligning the E-glass cloth 24 fibers of warp and fill at 0 and 90 degrees respectively to the length of the shingle. Thus, one set of continuous fibers is provided running chordwise which controls excessive bending from wind uplift, as shown. The upper Kevlar cloth 28 ply has warp and fill fiber orientation at +/−45 degrees, respectively. Different ply orientations are possible and can alter performance significantly. Other ply variations include but are not limited to the total number of plies and type of material used in each ply, thickness of material used in each ply, and the order of ply sequence.

Ideal fiber and coating (matrix) composition by volume should be a maximum of 60% fiber and 40% matrix, although a lower fiber content is acceptable. In general, the middle coating (matrix) of asphalt 22 is of greater hardness than the upper matrix of soft asphalt 30. Matrix hardness for each layer may vary through use of fillers, modifiers, or plasticizers. Although Kevlar exhibits excellent impact qualities due to intermolecular slippage, other fiber material variants may use release agents to increase slippage, and thus impact resistance.

Aggregate stone size 34 is preferably 0.03 inches in rough nominal diameter, but may be larger for increased impact protection. Reflective top coating paint 38 is preferrably thermo-chromatic pigmented paint which changes color with temperature. The pigment lightens in strong sunlight to reflect heat and conversely darkens during cool, shady days to absorb heat. Options may include LO/MIT-I, a silicone-based silver colored paint and aluminum reflectorized paint.

An overall perspective view of the inventive shingle in single-level construction is shown in FIG. 2. The basic shingle reference size is 12 inches in chord by 36 inches in length, with a nail region located along or just behind the stick strip 36 at mid-chord. Notched tabs provide an enhanced appearance. As shown, hail and wind damage can occur in the exposed region forward of the stick strip 36 if the shingle is left unreinforced.

FIG. 3 shows a cross-section schematic of the single-level shingle. The fiberglass mat 20 extends full chord width while reinforcement material plies 24 and 28 drop off just past the nail line. Asphalt coatings are continuous and have uniform thickness across the width of the shingle chord. The difference in overall thickness across the shingle is minimal since the mat 20 is much thicker than the fabrics 24 and 28.

An overall perspective view of the invention as it relates to a two-level, architectural type shingle is shown in FIG. 4. Again, the basic shingle reference size is 12 inches chordwise by 36 inches in length, with a nail region located along the stick strip 36 at mid-chord. The bottom strip is approximately 6.5 inches in chord by 36 inches in length, and is laminated to the notched upper shingle to increase exposed thickness and thus create the appearance of a wood shake. Variations in the chord widths of the upper and lower strip are also possible, including a full width lower strip laminated with an upper strip of 6.5 inches in chord width. As shown in FIG. 4, hail and wind damage can occur in the exposed region beyond the nail line unless appropriate steps to reinforce the shingle are taken.

FIGS. 5A and 5B show a cross-section schematic of the two-level shingle in detail. In both cases, a bottom strip identical in construction to that of the exposed single-level shingle region in FIG. 3 is used. This is laminated to the notched upper shingle section, with a nail line passing through the maximum material thickness. The upper laminated section is included mainly for decorative purposes and does not use reinforced materials. FIG. 5A shows the upper section with fiberglass mat 40 and asphalt coating 42 in use while FIG. 5B has additional coatings of materials 26 and 30. In either case, the material formulation in coating 42 may not necessarily be the same as in coating 22.

DESCRIPTION OF INVENTION—UNUSUAL THEORY

While composite materials owe their unique balance of properties to the combination of fibers (reinforcement) and resin (binding matrix), it is the fiber system which is primarily responsible for superior performance. Kevlar, an aramid fiber by Dupont, has many interesting and inherently useful properties which make the material ideal for use in roofing products. Kevlar has extremely high toughness, i.e. impact and tear resistance, making the fiber useful in items such as bullet-proof vests. It has very high tensile strength and stiffness with the lowest density of advanced composite materials. On a pound for pound basis, unidirectional Kevlar is five times as strong as steel. Kevlar is flame, corrosion, and ultraviolet ray (UV) resistant. It is a dimensionally stable and fatigue resistant material which has additional insulative sound and heat properties.

One of the greatest advantages of advanced composite materials is in tensile strength optimized for primary load directions. In order to prevent shingle bending from wind force, previous roofing products have simply increased overall thickness using isotropic materials (i.e. uniform properties in all directions). This brute force method does increase the cross-sectional moment of inertia (and thus resistance to bending), but is inefficient as well as heavy and costly. The key advantages of the inventive shingle are realized through the use of anisotropic materials such as fabric Kevlar and E-glass. Proper use of these materials allows superior strength to be achieved in preferred directions, without greatly increasing overall shingle thickness or weight.

A rather unusual principle normally avoided in composite design is advantageously used to impart additional wind resistant characteristics. By stacking composite fiber plies asymmetrically in a laminate, bending and/or twist coupling can occur. In this unbalanced arrangement, the shingle forms a slightly concave surface, thus providing additional resistance to bending when the lower fibers or plies are under tension. This phenomenon occurs because the modulus weighted centroid of the cross-section is not coincident with the geometric centroid, resulting in an offset load path. The technique, commonly known as aeroelastic tailoring, has been used with great success in the NASA X-29 forward swept wing aircraft to prevent excessive wing divergence and flutter.

FIGS. 6A and 6B describe the aeroelastic concept in greater detail. The overall weighted elastic modulus of the materials is located below the geometric centroid of the shingle, thereby imparting slight convex curvature of the exposed surface of the shingle when the shingle is placed under tension. FIG. 6A shows a cross section of the inventive shingle with the lower material layer having an elastic modulus $E1$ and the upper material layer elastic modulus designated as $E2$. Elastic modulus refers to the respective material stress/strain characteristics. The center layer is assumed to be random fiberglass mat with minimal load capabilities. The geometric centroid is the geometric center of an object. When the object is of uniform density the geometric centroid is the same as the center of gravity (center of mass) and can be determined experimentally. When an object does not have a uniform density the geometric centroid can be different than the center of gravity. Referring to FIGS. 6A and B the portion of the shingle exposed to the wind is of primary concern in designing the shingle to resist bending by the wind. In the illustrated embodiment, for a typical residential shingle the portion of interest is that below and to the left side of the nail line as shown in FIGS. 6A and 6B. Thus, the shingle can be designed to resist wind force by determining the geometric centroid of the portion which will be subject to wind forces and the weighted modulus of elasticity centroid along the chord line. The weighted modulus of elasticity centroid is calculated by determining the modulus of elasticity (i.e. elastic modulus, or E) for each reinforcing layer. E is a constant which is an expression of the ratio of the unit stress to the unit deformation of a structural material, as long as the stress is below the proportional limit. For each reinforcing layer, E in the direction of the chord is determined. The weighted E is determined for each reinforcing layer by multiplying E times the distance from the geometric centroid and the thickness of the layer. The weighted E for the lower layer which lays next to the roof should be greater than the weighted E of the upper reinforcing layer next the atmosphere. This will place the overall weighted E below the geometric centroid, providing a shingle with a stiffer lower portion than upper portion in the chordwise direction which will resist lifting by the wind as shown in FIG. 6B. In general, modulus weighting (i.e. $E*t*x$) can be increased by selecting materials with higher stress/strain properties (E), greater material thickness (t) such as adding more plies, or locating the plies further from the geometric centroid of the shingle (x). Most importantly, material modulus (i.e. stress/strain) can be changed in the chordwise direction by simply orienting the fabric properly during layup. Therefore, a material may have different E values at different orientations. For instance, fabric in the +/−45 degree direction has much less strength than the same fabric in the 0/90 degree direction.

As shown in FIG. 6B, the inventive shingle resists wind uplift force because the selected material and ply orientations are optimized to increase bending resistance in the bottom ply. Additional aeroelastic tailoring effects impart a slightly convex surface during bending and help hold the shingle down in place. Tear strength at the nail line is also greatly increased through use of Kevlar in the top ply. Conversely, FIG. 7 shows the effects of high wind upon a typical prior art composite shingle when viewing a cross-section corresponding to that of section 6—6. As the wind flows chordwise, an uplifting force is created which can rip the shingle off the roof with the tear normally occurring at the nail line. Material failure occurs because random fiberglass mat exhibits low strength properties in tension and tearout.

DESCRIPTION OF INVENTION—FUNCTION

Figure 8:
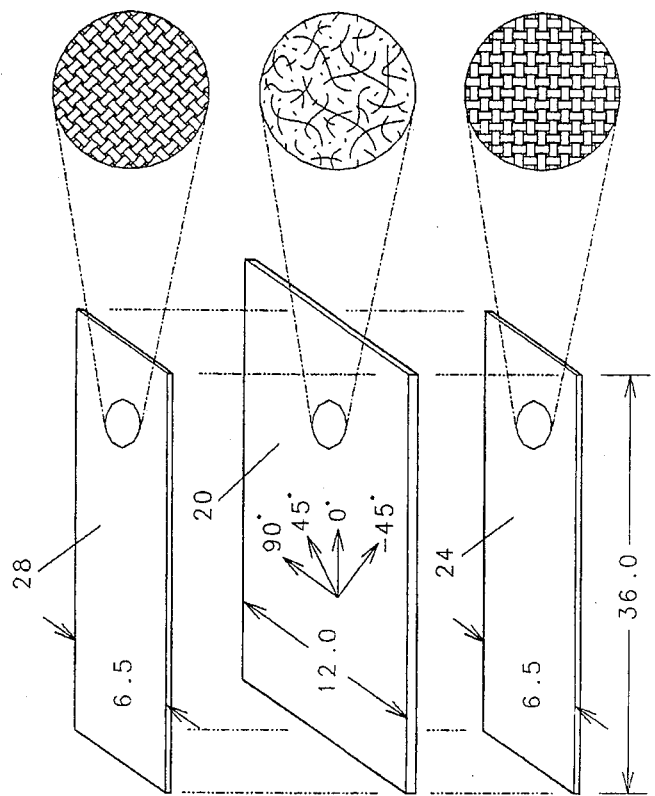
FIG. 8 is an exploded perspective view of a single-level shingle of this invention, showing ply stack sequence and close-up details of only the fibrous materials.

FIGS. 8 and 9 clarify the fiber material form and function for each layer of the inventive shingle. For illustrative purposes, only the fiber plies are shown in these figures. A rosette is labeled for reference to denote fiber orientation or direction. Reference dimensions are also given. FIG. 8 describes the ply stacking sequence for a single-level shingle. The bottom material 24 is composed of plain woven E-glass fabric with half of the fibers oriented in the 0 degree direction and the other half in the 90 degree direction. Strength is approximately equal in both directions. The chordwise fibers (90 degrees) are oriented to provide high strength and resistance to bending caused by wind gusts, while the spanwise fibers (0 degrees) reduce unnecessary bending in the lateral direction. The middle layer 20 is composed of fiberglass mat. Random fiber direction and increased material thickness provides bulk as well as stability at the shingle neutral axis, or geometric center. The top layer 28 is composed of plain woven Kevlar fabric, which provides a shield from hail impact damage. As shown, half the fibers (warp) are oriented in the +45 degree direction, with the remaining fibers (fill) oriented in the −45 degree direction. Although this orientation does not necessarily improve impact resistance, it does create an asymmetrical laminate with overall properties that reduce bending caused by wind uplift. These same +45/−45 oriented fibers also allow roof apex trim shingles to be installed in a conformal, bent fashion with minimal resistance.

The two-level 'architectural' type shingle shown in FIG. 9 operates in much the same manner as the shingle in FIG. 8. However, the final stack sequence includes a precut decorative ply 40 composed of random fiberglass mat. This ply provides bulk thickness to create a three-dimensional effect for mainly aesthetic purposes, and does not contribute significantly to shingle impact resistance. Although costly, an alternate shingle design could include additional materials 24 and 28 laminated with material 40 to provide an extra strong architectural ply. However, overall shingle strength would not be increased in the cutout regions.

DESCRIPTION OF INVENTION—PRODUCTION AND OPERATION

Figure 10:
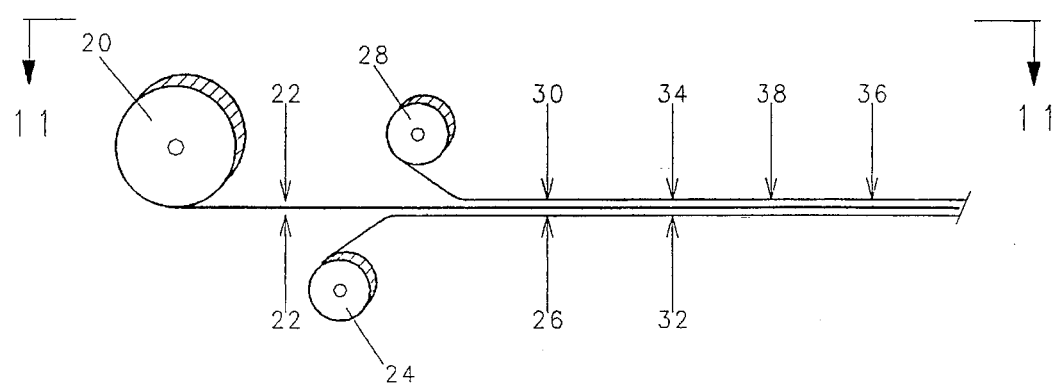
FIG. 10 shows a construction process flow chart for shingles of this invention.

Minimizing manufacturing complexity is important when considering a successful inventive design, along with impact on existing production facilities and increased tooling costs. As shown in FIG. 10, the inventive shingle has been designed for minimal adaptation of current production methods, which are well known by those skilled in the art and need not be described in detail. In the flowchart, a fiberglass mat roll 20 is unreeled while an asphalt bath 22 coats both sides. Next, both rolls of advanced materials 24 and 28 are unreeled and adhered to coating 22. Coatings 26 and 30 are then sprayed to seal and provide a matrix for the advanced materials 24 and 28 as well as a substrate for the talc 32 and stone granules 34 to adhere to. Finally, an optional reflective coating 38 is sprayed on the top and a stick strip 36 is applied to the continuous shingle assembly. For the two-level shingle case, asphalt bathcoat 42 may also be sprayed at the same time as coating 22 if required.

Figure 11A:
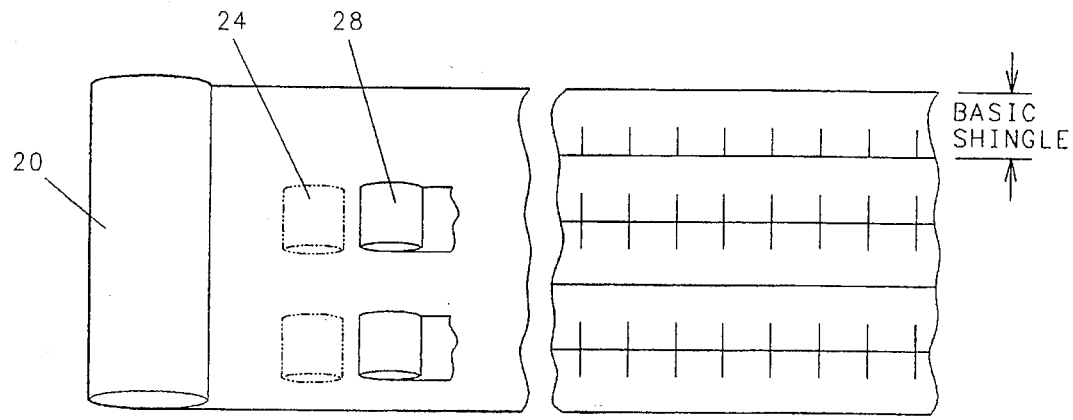
FIGS. 11A and 11B are views looking down on the construction process in FIG. 9 taken on the line of 10—10 and relate to single-level and two-level shingle production, respectively.
Figure 11B:
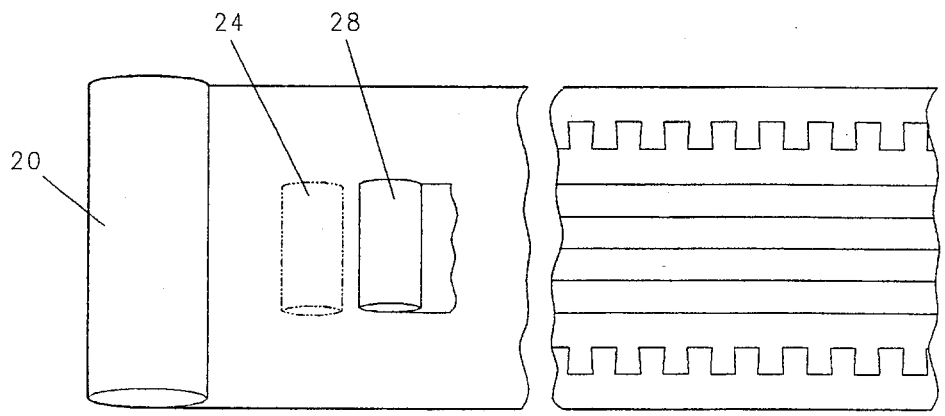

Both single and two-level type shingles heretofore described have the initial process shown in FIG. 10 in common. The minor assembly differences are shown in FIGS. 11A and 11B. FIG. 11A shows an assembly top view of single-level shingle construction. Two small rolls each of materials 24 and 28 approximately 12 inches wide are rolled out to cover only the as-installed exposed region. A cutting machine then forms the decorative tab cutouts, individual shingles are cut to size, and finally packaged. If there is excessive fiberglass mat 20 on one side of the sandwich construction, a row of conventional basic shingles without materials 24 and 28 can be produced as shown and installed on roofs in regions of the country with mild climates.

FIG. 11b shows an assembly top view of two-level architectural type shingle construction. In this case, unreeled materials 24 and 28 are wide enough to cover the lower shingle strips in the center of the unreeled fiberglass mat 20. This portion forms the protective lower laminate, while the excess mat 20 on each side is used to form the upper decorative laminate. After the machine cuts the respective shapes, the upper and lower strips are bonded together, cut to length, and finally packaged.

Figure 12:
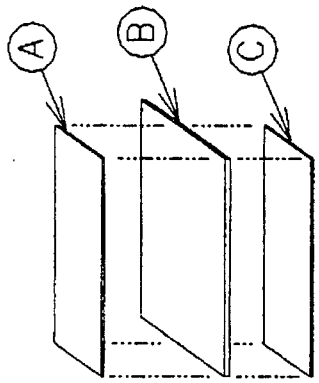
FIG. 12 shows a table defining hail size classes and an example of composite material selection for constructing shingles in each class.

In actual operation and use, the inventive shingle should protect against expected threats from hail and wind damage, but not become overdesigned. Studies have statistically shown for instance, that hail coverage varies for different geographical regions of the country. One comprehensive study by Baldwin has found that in general, expected hailstone diameter (D) is equal to 0.3 times the mean annual days of recorded hail (d) for a given region. The derived 'isoparameters' or gradient curves from this statistical analysis can then be drawn across a map of the country. From this, a class system based on hail sizes can be created, as shown in FIG. 12. In a class 4 region, for example, the mean annual days of hail ranges between 4 and 6, while the hail stone size may range from 1.2 to 1.8 inches in average diameter.

Since some regions sustain more damage (such as class 5) than others (such as class 1), it would be efficient to tailor the type and amount of advance materials used in the inventive shingle to reduce unnecessary cost caused by overprotection. As previously shown in FIGS. 10 and 11, material rolls can be easily changed and substituted during production. FIG. 12 shows such a possible list of materials which could be used for each respective class. The material listed in category A is the upper ply used for impact protection, while category B bulk material is added for stability. The bottom ply material C prevents excessive bending and wind damage, as previously explained. Other variations and alternate designs are possible. For instance, to reduce cost, a hybrid fabric composed of a ratio of Kevlar and E-glass fibers can be substituted in category A, as shown at right. Only the minimum amount of Kevlar fibers needed to protect the shingle integrity is used in the hybrid weave. Thus, a truly optimum design is achieved which is matched for a specific class or region of the country.

DESCRIPTION OF INVENTION—INSTALLATION

During installation, the inventive shingles are nailed in place with methods similar to conventional composition shingles. As in most cases, a rigid underlayment improves shingle durability by providing sufficient support. However, when nailing in place, the impact resistant shingle helps minimize accidental tear occurrences. Another improvement is exhibited during cold weather installation. Due to enhanced bending resistance, the inventive shingle reduces wind uplift occurrences before the self-sealing stick strip has a chance to adhere the overlapping shingle rows together. For actual self-sealing to occur, higher ambient temperatures must be attained.

Shingles at the roof edges are trimmed in the conventional manner, unless Kevlar is involved. Since Kevlar has a high resistance to tearing, special shears should be used. During cold temperatures, the roof apex trim shingles may be heated prior to bending and nailing in place, thereby overcoming stiff asphalt bending resistance.

CONCLUSIONS, RAMIFICATIONS, AND SCOPE

Accordingly, the reader will see that the roofing shingle of the invention offers a quantum leap in technology through the selective use of advanced composite materials. The upper Kevlar fabric layer provides high impact resistance to hail destruction which commonly occurs with most roof systems. It also prevents accidental tearing of material caused by nail damage during installation. A conventional bulk layer of fiberglass mat provides shingle thickness, while the underside E-glass fabric layer provides enhanced bending and tear resistance to wind uplift. Aeroelastic tailoring provides additional dynamic bending resistance through selective use of composite materials and fabric ply orientations. Furthermore, the inventive shingle has the additional advantages in that;

it provides a similar appearance to that of conventional composite shingles with superior durability at approximately the same weight;

it allows the use of available materials and existing production facilities with only minor modification;

it conforms to existing installation methods which are straight forward to use;

it provides an environmental benefit by reducing landfill waste caused by repeated shingle replacement;

it reduces home energy costs through the use of insulative materials and temperature sensitive paint technology.

it provides for design optimization of roofing shingles which can be tailored to a specific class of protection for each part of the country.

it solves an increasing demand by consumer, insurance industry, and government for a durable, energy efficient, low cost roofing system;

it provides an improved performance roofing shingle through a useful technological spin-off from the Aerospace industry to the consumer.

While the above description contains many specificities, these should not be construed as limitations on the scope of the invention, but rather as an exemplification of one preferred embodiment thereof. Many other variations in composition are possible. For example, possible fiber substitutions include Spectra, carbon, nylon and polyester. Through the use of biominetics, or biological mimicking, spider silk thread can eventually be synthesized to form insoluble fibers that are stronger than even Kevlar. Different fiber weave patterns are also available, which include crowfoot, basket, braided, knitted, random mat, and unidirectional tape. Other available matrix or coating materials include modified asphalts (i.e. SBS), EDPM rubber, polysulfide, and also thermoplastics with plasticizer. Matrix performance can be easily modified by changing hardness, or adding fillers and fiber release agents. Decreasing the fiber/matrix volume ratio can also change performance.

The uniqueness of composites also allows an infinite variation and combination of layup options. For instance, the number of plies can be added or subtracted. Thickness of each ply can be individually changed, as well as the coarseness of fabric weave. Order of plies, (i.e. stacking sequence) and ply orientation can be modified which can affect symmetry and balance. Finally, hybrid materials offer a custom designed approach to performance and cost. Any combinations or permutations of the described materials and methods are possible.

Alternate uses for the described invention are possible where high impact strength, bending resistance, low weight, or higher operating temperatures are required. The invention may take the form of flexible tent roofs, roof awnings, commercial built-up roofing (BUR), and exterior wall siding. Other applications to the material concept include use in automobile roofs and panels, and radiator hoses.

The scope of the invention should thus be determined by the appended claims and their legal equivalents, rather than by the examples given.

I claim:

1. A roofing shingle having an exposed surface comprising:

(a) a fibrous mat material having a chord and a length and top and bottom side;

(b) an upper layer of directional fiber positioned adjacent to the top side of said mat;

(c) a lower layer of directional fiber positioned adjacent to the bottom side of said mat; and (d) a semi-flexible matrix compound impregnating the said fibrous mat, said upper layer, said lower layer wherein the directional fiber's upper and lower layers are oriented and positioned with respect to each other such that the overall weighted elastic modulus of said materials in the chordwise direction is located below the geometric centroid of said shingle, thereby imparting slight convex curvature of said exposed surface when said shingle is placed under tension in a chordwise direction.

2. The shingle of claim 1, wherein said upper layer is composed of impact resistant aramid fabric.

3. The shingle of claim 1, wherein said lower layer is composed of E-glass.

4. The shingle of claim 1, wherein said semi-flexible matrix material is an asphalt compound.

5. The shingle of claim 1, further including a layer of stone aggregate material no less than 0.03 inch in mean diameter positioned adjacent to the side of said upper layer opposite said fibrous mat.

6. The shingle of claim 1, further including a coating of thermochromatic paint which darkens in cold temperatures and lightens in hot temperatures positioned adjacent to the side of said upper layer opposite said fibrous mat.

7. The shingle of claim 1, wherein said lower layer has continuous fibers oriented chordwise, thereby controlling excessive bending from wind uplift.

8. The shingle of claim 1 wherein said matrix compound is more dense and stiff in the area surrounding said fibrous mat than in the area surrounding said upper and lower layers.

9. The shingle of claim 1 wherein said upper layer has continuous fibers oriented at a 45 degree offset with respect to the chordwise direction.

10. The roofing shingle of claim 1 further comprising a second fibrous mat of a predetermined shape positioned adjacent to said upper layer on the side of the upper layer opposite said fibrous mat, and said second fibrous mat being impregnated with said semi-flexible matrix compound and being adhered to said upper layer.

11. The shingle of claim 1 wherein said upper layer is a hybrid woven material of aramid fibers and E-glass fibers wherein the ratio of the number of aramid fibers (K) to E-glass fibers (E) expressed in terms of K/E is from 0 to 4.

12. The shingle of claim 1 where said upper layer of directional fiber is selected from the group consisting of aramid, fiberglass and hybrid fiber mixtures which contain aramid or fiberglass as one of the fibers, and wherein said lower layer of directional fiber is selected from the group consisting of aramid, carbon, polyester, nylon, fiberglass and combinations thereof.

13. A roofing shingle having an exposed surface comprising:
   (a) a fibrous mat material having a chord and a length and top and bottom side;
   (b) an upper layer of directional fiber material having sufficient strength to resist tearing when impacted by hail having a mean diameter of 0.6 inches or greater, positioned adjacent to the top side of said mat;
   (c) a lower layer of directional fiber material having sufficient strength to resist wind uplift, positioned adjacent to the bottom side of said mat; and
   (d) a semi-flexible matrix compound impregnating said fibrous mat, said upper layer, and said lower layer wherein the directional fiber in said upper and lower layers are oriented and positioned with respect to each other such that the overall weighted elastic modulus of said materials in the chordwise direction is located below the geometric centroid of said shingle, thereby imparting slight convex curvature of exposed surface when said shingle is placed under tension in a chordwise direction.

14. The shingle of claim 13 wherein said matrix compound is more dense and stiff in the area surrounding said fibrous mat than in the area surrounding said upper and lower layers.

15. The shingle of claim 11, wherein said upper layer is composed of aramid fabric.

16. The invention of claim 13, wherein said lower layer is composed of E-glass.

17. The shingle of claim 13, wherein said semi-flexible matrix material is composed of an asphalt compound.

18. The shingle of claim 13, further including a top layer of stone aggregate material no less 0.03 inch in mean diameter positioned adjacent to the side of said upper layer opposite said fibrous mat.

19. The shingle of claim 13, further including a top coating of thermochromatic paint which darkens in cold temperatures and lightens in hot temperatures positioned adjacent to the side of said upper layer opposite said fibrous mat.

20. The shingle of claim 13, wherein said lower layer is a woven fabric having continuous fibers oriented chordwise, thereby controlling excessive bending from wind uplift.

21. The shingle of claim 13 where said upper layer of directional fiber is selected from the group consisting of aramid, fiberglass and hybrid fiber mixtures which contain aramid fibers, or fiberglass as one of the fibers, and wherein said lower layer of directional fiber is selected from the group consisting of aramid, carbon, polyester, nylon, fiberglass and combinations thereof.

22. The shingle of claim 13 wherein said upper layer has continuous fibers oriented at a 45 degree offset with respect to the chordwise direction.

23. The roofing shingle of claim 13 further comprising a second fibrous mat of a predetermined shape positioned adjacent to said upper layer on the side of the upper layer opposite said fibrous mat, and said second fibrous mat being impregnated with said semi-flexible matrix compound and being adhered to said upper layer.

24. The shingle of claim 13 wherein said upper layer is a hybird woven material of aramid fibers and E-glass fibers wherein the ratio of the number of aramid fibers (K) to E-glass fibers (E) expressed in terms of K/E is from 0 to 4.

* * * * *